Aug. 13, 1957 M. B. CONRAD 2,802,534
RETRIEVABLE DOUBLE HOLDING SUBSURFACE WELL TOOL
Filed Sept. 26, 1955 6 Sheets-Sheet 2

INVENTOR.
MARTIN B. CONRAD
BY
Mellin and Hanscom
ATTORNEYS.

Aug. 13, 1957     M. B. CONRAD     2,802,534
RETRIEVABLE DOUBLE HOLDING SUBSURFACE WELL TOOL
Filed Sept. 26, 1955     6 Sheets-Sheet 3

INVENTOR.
MARTIN B. CONRAD
BY
Mellin and Hanscom
ATTORNEYS.

Aug. 13, 1957 M. B. CONRAD 2,802,534
RETRIEVABLE DOUBLE HOLDING SUBSURFACE WELL TOOL
Filed Sept. 26, 1955 6 Sheets-Sheet 5

INVENTOR.
MARTIN B. CONRAD
BY
Mellin and Hanscom
ATTORNEYS.

Aug. 13, 1957 M. B. CONRAD 2,802,534
RETRIEVABLE DOUBLE HOLDING SUBSURFACE WELL TOOL
Filed Sept. 26, 1955 6 Sheets-Sheet 6

INVENTOR.
MARTIN B. CONRAD
BY
Mellin and Hanscom
ATTORNEYS.

United States Patent Office 2,802,534
Patented Aug. 13, 1957

2,802,534

RETRIEVABLE DOUBLE HOLDING SUBSURFACE WELL TOOL

Martin B. Conrad, Downey, Calif., assignor to Baker Oil Tools, Inc., Los Angeles, Calif., a corporation of California Application September 26, 1955, Serial No. 536,415

31 Claims. (Cl. 166—138)

The present invention relates to subsurface well tools, and more particularly to tools capable of being anchored in a well bore against substantial movement in both longitudinal directions, to perform different operations in the well bore, such as squeeze cementing, high pressure acidizing, formation fracturing, swabbing, testing, producing, and tubing anchoring and catching.

An object of the present invention is to provide an improved retrievable subsurface well tool capable of being anchored in a well bore against movement in both longitudinal directions.

Another object of the invention is to provide a retrievable subsurface well packer capable of being anchored in the well bore against movement in both longitudinal directions and of holding fluid pressure from above the packer, as well as from below the packer.

A further object of the invention is to provide a retrievable subsurface well tool or well packer capable of being lowered in the well bore on a tubular string and of being anchored in the well bore against longitudinal movement in both directions, the tool having a full bore or inside diameter through it that is generally equal to or greater than the bore through the tubular string, to permit passage through the tool of other equipment, such as recording instruments and jet perforators. The full bore through the tool also prevents its plugging, as well as plugging of the tubular string by sand used in a formation fracturing operation, and, in general, minimizes greatly the opportunity of relatively solid substances in a fluid carrying medium from settling out of the medium and restricting or completely plugging the apparatus in the well bore.

Yet another object of the invention is to provide a retrievable well packer capable of being anchored in packed-off condition in the well bore against movement in both longitudinal directions, and embodying a retractable and expansible type of structure capable of holding fluid pressures both above and below the packer, the packing structure effecting an automatic pack-off when the direction of pressure is reversed.

An additional object of the invention is to provide a retrievable well packer capable of being anchored in packed-off condition against movement in both longitudinal directions, and embodying an initially retracted packing structure capable of being expanded to hold fluid pressure differentials from below the packer, the packing structure automatically operating to remain in a packed-off condition in the event of its being subjected to a pressure differential from above the packer. Conversely, the retrievable well packer may be arranged for outward expansion of its packing structure to hold fluid differentials from above the packer, the packing structure automatically operating to remain in a packed-off condition when subjected to a pressure differential from below the packer.

Still a further object of the invention is to provide a retrievable well packer adapted to be lowered in a well bore on a tubular string, which can be anchored in the well bore against movement in both longitudinal directions, and which embodies an initially retracted packing structure expandible outwardly in response to longitudinal movement of the tubular string in one direction, and in which longitudinal movement of the tubular string in the opposite direction effects retraction of the packing structure, to permit circulating fluid to be pumped therearound while the packer remains anchored in the well bore.

Yet a further object of the invention is to provide a retrievable subsurface well tool capable of being anchored in a well bore against longitudinal movement in both directions, and embodying a safety device insuring removal of all, or at least the major portion, of the tool from the well bore in the event it becomes stuck therein.

Another object of the invention is to provide a retrievable well tool to be lowered in a well bore on a tubular string and capable of being anchored in the well bore, the tool embodying a releasable clutching or latch device for preventing inadvertent expansion of parts of the tool, the device being operable by manipulation of the tubular string which need not be subjected to a continuing strain to hold the device in its released position. Once the latch or clutching device is released, it will remain in such released condition, until purposely placed in a position to be relatched or reclutched.

A further object of the invention is to provide a subsurface well tool embodying a releasable clutching device for retaining parts of the tool in a particular position with respect to each other, the clutching device being comparatively simple in construction, easy to operate, and having a very high load transmitting capacity.

An added object of the invention is to provide a retrievable subsurface well tool capable of use as an anchor to hold a string of tubing in tension, the tool acting to automatically support the tubing string in the event of its breaking to prevent its dropping down the well bore.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings.

In the specific form of apparatus illustrated in Figs. 1 to 8, inclusive, a well packer A can be anchored in packed-off condition in a well casing B against substantial longitudinal movement in both directions. The well packer is lowered through the well casing to the desired setting point by means of a tubular string C, such as drill pipe or tubing extending to the top of the hole, and through which fluent material under pressure can be pumped for movement through the well packer and for discharge into the well bore below the well packer. The well packer is capable of being anchored in packed-off condition in the well casing against upward movement therein. It is also capable of being anchored in packed-off condition in the well casing against downward movement therewithin, the packer unit being capable of withstanding extremely high pressure differentials imposed upon it both from below its packed-off location in the well casing, as well as from a region above its packed-off location in the well casing.

The well tool A can be positively locked, to hold its various elements in their retracted positions to permit its upward and downward movement in the well casing, and can be easily released to secure its anchoring in packed-off condition whenever desired. Following the performance of the desired operation or operations in the well bore, the well packer can be shifted, to place its several parts in their retracted position once again to enable the apparatus to be elevated in the well casing to a new setting location, to be entirely removed from the well casing, or to be lowered in the well casing to a new setting location. If difficulty is encountered in retrieving the well tool, then the parts can be forcibly returned to their retracted positions, or if such efforts are unavailing, then the major portions of the apparatus can still be removed from the well casing.

As specifically disclosed in the drawings, the well tool A includes an elongate body 10 of tubular form whose upper end is threadedly secured to an upper expander 11, which is, in turn, threadedly secured on to the lower portion of the tubular string C that extends to the top of the well bore. The upper expander could be secured to structural members that intervene between it and the tubular string, if desired. The lower end of the body 10 is provided with an external left-hand thread 12 threadedly secured within a companion internal left-hand thread 13 in a guide member 14 which may be considered as actually constituting part of the tubular body itself. The lower portion of the guide member may have a threaded box 15 to permit tubing (not shown) to be attached thereto, if desired, for extension to a lower portion in the well casing B.

The inside diameter of the passage 16 through the body 10 of the tool, as well as through the upper expander 11 and lower guide 14, is comparatively large, being at least equal to the inside diameter of the tubing string C extending to the top of the well bore, to facilitate the pumping of fluent materials, such as cement slurry, sand and oil mixtures used in fracturing operations, and the like therethrough. The full bore 16 through the tool also enables other equipment, such as pressure and temperature recording instruments, and jet perforators, capable of being moved down through the tubular string C, to pass therethrough for disposition at any desired location below the well packer A. Such instruments and perforating tools can be removed through the well tool, when desired.

The upper expander 11 coacts with an upper set of circumferentially spaced slip members 17 to anchor the well tool to the well casing against downward movement therein. Slidably mounted on the body or mandrel 10 of the tool is a lower expander 18 that coacts with a lower set of circumferentially spaced slip members 19 to anchor the well packer to the well casing against upward movement therein. Disposed below the lower expander is a packing structure 20 capable of effecting a fluid tight seal against the wall of the well casing B, to prevent passage of fluids under high pressure in both directions between the body 10 of the tool and the casing. The upper expander 11 and upper set of slips 17 operate jointly with the packing structure 20 to anchor the well tool in packed-off condition in the well casing against downward movement, or the lower expander 18 and lower set of slips 19 act jointly with the packing structure 20 to anchor the well tool in packed-off condition within the well casing against upward movement therein. The slips 17, 19 and packing structure 20 can be prevented from being expanded outwardly into engagement with the well casing by means of a clutching or latch device 21, which is operable from the top of the well bore. As specifically disclosed in the drawings, this clutching or latch device is located between the upper and lower sets of slips 17, 19.

The upper set of slip members 17 is mounted in circumferentially spaced, longitudinally extending slots 22 in an upper slip ring 23 is slidable on the body 10 of the tool. Each upper slip member 17 includes an upper gripping portion 24 having external wickers or teeth 25 facing in a downward direction to anchor the tool against downward movement in the well casing, the inner surfaces 26 of such gripping portions being inclined in a downward and inward direction for cooperation with a companion externally tapered surface 27 on the upper expander 11, in order that downward movement of the upper expander within the slips can expand the gripping portions 24 outwardly into anchoring engagement with the well casing B and hold such gripping portions in such anchoring engagement. Each slip member 17 also includes an intermediate drag block portion 28 adapted to frictionally engage the wall of the well casing. The drag block portions are normally urged into full lengthwise engagement with the wall of the well casing by laterally disposed, helical compression springs 29, there being one spring disposed in each groove 22, with its inner portion bearing against the base of the latter and its outer portion bearing against the base of a socket 30 formed within the drag block portion of each slip member.

The axis of the spring 29 is below the upper end 31 of the drag block portion, and when forcing the drag block into lengthwise frictional engagement with the well casing B, the upper gripping portion 24 is disposed inwardly substantially out of contact with the wall of the well casing. When the upper expander 11 is moved downwardly within the slips 17, they will shift the gripping portions 24 outwardly, pivoting the drag block portions 28 about the point or line of engagement of their upper ends 31 with the casing as a fulcrum and away from the well casing. In effect, each slip member 17 is a lever of the first class, in which the upper end 31 of the drag block portion acts as a fulcrum upon the casing, the spring 29 constantly tending to swing the lower portion of the slip member outwardly to engage the drag block portion 28 fully with the well casing and the gripping portion 24 inwardly out of engagement with the well casing. When the upper expander 11 is moved downwardly within the gripping portion 24, it rocks the slip member 17 about its fulcrum point of engagement 31 with the casing, to shift the upper gripping portion 24 into anchoring engagement with the wall of the well casing and to tilt the lower portion of the slip member in a direction inwardly of the wall of the well casing.

When the expander 11 is out of engagement with the gripping portions 24, the inner surfaces 26 of the gripping portions are inclined with respect to the expander surface 11. However, when the expander 11 moves into engagement with such inner surfaces 26, to tilt the gripping portions 24 outwardly against the well casing, then a full surface contact is made between the expander and the gripping portions.

To insure joint longitudinal movement of the upper slip members 17 within the well casing, and to hold them in transverse alignment with respect to each other, a retaining ring 32 circumscribes the slip members immediately above their drag block portions 28. This ring is located in external grooves 33 in the slip members, being adapted to engage the upper and lower sides of the slip grooves. The ring 32 also serves to limit outward expansion of the slip members 17 under the influence of the springs 29 prior to insertion of the tool in the well casing, by virtue if the engagement of the base of the slip grooves 33 with the retainer ring. This retainer ring 32 bears against an outwardly directed interrupted flange 34 at the upper end of the upper slip ring 23, in order that downward movement of the slip ring will cause the flange 34 to engage the retainer ring 32, which, in turn, engages the bottom of the slip grooves 33 to cause the slips 17 to move jointly with the retainer ring.

Below the drag block portions 28, the upper slip members 17 incline in a downward and inward direction, terminating in lower foot portions 35 that are adapted to engage an upwardly projecting flange 36 of a stop ring 37 suitably secured to the upper slip ring 23, as through use of longitudinally extending cap screws 38. The flange also limits the extent of outward expansion of the slip members 17 under the influence of the springs 29 while the well tool A is out of the well casing B.

The lower set of slips 19 is the same as the upper set of slips, being reversely arranged. Accordingly, it is unnecessary to an understanding of the invention for a complete description of the lower set of slips and its holding arrangement to be given. It is sufficient to state that the lower set of slips 19 has a lower gripping portion 39 with teeth or wickers 40 facing in an upward direction to anchor the tool against upward movement in the well casing. It also has inner surfaces 41 inclined in an upward and inward direction for coaction with a companion tapered surface 42 on the lower expander. It has a drag portion 43 and the springs 44 for urging the drag portion into engagement with the wall of the well casing, the slips being held in appropriate position in circumferentially spaced, longitudinal slots 45 in a lower slip ring 46 by means of a retaining ring 47 disposed in the slip grooves 48 that are engageable with the lower slip ring flange 49. The upper ends 50 of the lower slips are formed as stop portions engageable with a downwardly extending flange 51 of a lower stop ring 52, to limit outward expansion of the lower slip members 19 under the influence of the springs 44. This lower stop ring 52 is suitably secured to the lower slip ring 46, as by longitudinally extending cap screws 53.

The clutching device 21 is interposed between the upper and lower sets of slips 17, 19. More particularly, it is located between the upper and lower stop rings 37, 52. The lower end of the upper stop ring 37 bears upon a limit ring 54, which has a space or guide groove 55 therein containing a laterally movable lock segment or clutching element 56. This lock segment is of arcuate form and is urged inwardly into engagement with the mandrel 10 of the tool. It can be received within a circumferential groove 57 extending a substantial distance around the body or mandrel of the tool. Disposed between the circumferential ends of the body lock groove 57 is an arcuate bridge segment 58 which can shift the lock segment 56 radially outward when the tubular string C and the body 10 are rotated, as hereinafter described.

The lock segment 56 is urged inwardly against the body 10 and into the circumferential or arcuate groove 57 by a helical compression spring 59 received within and bearing against the base of a socket 60 formed in the outer portion of the segment, with the outer portion of the spring bearing against a seat 61 integral with the limit ring 54 and extending downwardly across the limit ring space 55. The lower surface of the limit ring 54 bears against a spacer ring 62, which is secured to the lower stop ring 52 by the same screws 53 that attach the lower stop ring to the lower slip sleeve 46. The limit ring 54 is prevented from rotating relative to the upper stop ring 37 and the upper slip structure by virtue of the reception of the heads 63 of the upper cap screws 38 within companion sockets 64 in the upper portion of the limit ring.

The entire slip and clutching structure externally of the body of the tool is held together against relative longitudinal movement by a swivel or coupling sleeve 65 threadedly secured to the upper stop ring 37, and which extends downwardly along the limit ring 54 and the spacer ring 62, there being a lower inwardly directed flange 66 on the swivel sleeve engaging within an external groove 67 defined between the spacer ring 62 and the lower stop ring 52. By virtue of the fact that the sleeve 65 is connected to the upper stop ring, and because of the fact that relative rotation between the upper stop ring 37 and the limit ring 54 is prevented by the heads 63 of the upper cap screws 38, the sleeve 65, limit ring 54 and upper stop ring 37, as well as the upper slip ring 23 and upper slip structure, can rotate or turn relative to the spacer 62, lower stop ring 52, lower slip ring 46 and the lower slip structure. Such turning movement is only necessary under certain conditions that will be described hereinbelow. When it does occur, it is evident that the limit ring 54 is slidable arcuately upon the spacer ring 62. During such sliding movement, the lower side of the lock segment 56 can also slide along the upper surface of the spacer ring 62. In this connection, it is to be noted that actually the space or groove 55 in which the lock segment or clutching element 56 is laterally slidable is defined by the upper surface 68 of the spacer ring 62 and by the opposed wall 69 of the limit ring, the upper and lower sides of the lock segment 56 sliding along the upper side 68 and downwardly directed wall 69 of the spacer ring and limit ring, respectively.

The spring 59 urges the lock segment 56 inwardly. When the circumferential body groove 57 is in alignment therewith, the lock segment 56 can move into the groove 57 for the purpose of coupling the entire upper and lower slip structures to the body 10 in a particular position with respect to the upper and lower expanders 11, 18. Such position is a neutral one, in which neither the upper nor lower slips 17 or 19 can be anchored against the well casing. To insure the appropriate coupling action between the body 10 of the tool and the lock segment 56, the circumferential groove 57 is only slightly wider than the longitudinal extent of the segment, and the upper and lower sides 70 of the circumferential grooves are inclined toward each other in an outward direction for coaction with companion inclined sides 71 on the portion of the lock segment 56 that enters the groove, in order that longitudinal movement in both directions of the body or mandrel 10 of the tool will tend to retain the lock segment 56 in the groove, and thereby insure the coupling of the body of the tool to the clutching structure surrounding it. When the body 10 of the tool is rotated to the proper extent, the arcuate bridge segment 58 on the body will engage the lock segment 56 and shift it outwardly from the circumferential groove 57, whereupon the body 10 of the tool can move longitudinally in both directions with respect to the lock segment, and with respect to the entire slip structure surrounding the body. During its movement into and out of the groove 57, the lock segment 56 is guided by pins 72 secured in parallel relation to the limit ring 54 and extending into the groove 55 containing the lock segment.

The relative location of the body 10 of the tool with respect to the lock segment 56, so as to permit the lock segment to move into the groove 57, or to be shifted and held out of the groove, is positively determined. Thus, the locating or limit sleeve 54 has an upwardly extending arcuate stop segment 73 therein that projects upwardly within a counterbore or space 74 in the upper stop ring 37. The space 74 is of a length corresponding to the length of a key 75 partially positioned therein and slidable within a longitudinally extending keyway or groove 76 in the body or mandrel 10 of the tool. The key 75 is movable arcuately with the body 10 of the tool to the extent limited by its engagement with the opposite ends 77, 78 of the stop segment 73. When the body 10 of the tool is turned in one direction, as in a counterclockwise direction, or to the left, to place the key 75 in engagement with one end 77 of the stop segment, then the circumferential body groove 57 will have been moved into longitudinal alignment with the body lock segment 56, whereupon the spring 59 can shift the lock segment 56 into the circumferential groove 57, to couple the body 10 to the clutching members surrounding it when the groove 57 is transversely aligned with the segment. On the other hand, rotation of the tubular string C and the body 10 connected thereto in a clockwise direction, or to the right, will shift the body 10 with respect to the lock segment 56, the lock segment, if in the circumferential groove 57, not interfering with such relative rotation of the body because of the circumferential extent of the groove, until the body bridge segment 58 engages the lock segment 56 and shifts it laterally completely out of the groove 57. When the key 75 engages the opposite end 78 of the arcuate stop segment 73, the bridge 58 will have shifted the lock segment completely out of the arcuate groove 57 and will be in alignment therewith to hold it laterally outward within the ring space 57 to prevent it from moving back into the groove. When in this position, the body 10 of the tool can be shifted longitudinally in both directions with respect to the slip structure, the clutching segment 56 merely sliding along the periphery of the body 10.

As described above, the lower expander 18 is slidably mounted on the tool body 10, its upward movement therealong being limited by engagement of an internal shoulder 80 of the expander with an external body flange 81. The packing structure 20 is also operatively connected to the lower expander. This structure includes a booster sleeve 82 threadedly secured to the lower portion of the expander 18 for slidable movement therewith with respect to the body. Surrounding the booster sleeve is an upper packing ring 83 and a lower packing ring 84, made of rubber or rubber-like material, the upper packing sleeve 83 engaging the lower end of the expander 18, which functions as an abutment, as well as an upper gauge ring 84a threaded on the lower expander to reduce the clearance space with the well casing B through which the rubber packing material may extrude when the packing ring 83 is expanded outwardly. The upper and lower rings 83, 84 are separated by a spacer ring 85, the lower packing ring or sleeve 84 engaging a lower gauge ring 86 which is relatively slidable along the exterior of the booster sleeve 82. Downward movement of the lower gauge ring 86 along the booster sleeve 82 is limited by engagement of the gauge ring 86 within a lower shoulder 87 on the sleeve.

The lower gauge ring 86 is, in effect, a lower abutment which is movable toward the upper abutment or expander 18 for the purpose of foreshortening the packing sleeves 83, 84 and effecting their outward expansion into sealing engagement with the wall of the well casing B. The lower ring 86 is movable toward the lower expander 18 as a result of upward movement of the packer body 10. Thus, as described above, the packer body is threaded into the guide 14, the upper end of the guide being threaded onto the lower end of a thrust tube 88 which is threadedly secured to the lower gauge ring 86. Assuming that the lower expander 18 is prevented from moving upwardly, upward movement of the body 10 will cause the lower gauge ring 86 to move along the booster sleeve 82 toward the lower expander 18 to foreshorten the packing elements 83, 84 and expand them outwardly into engagement with the well casing. The upper portion of the guide 14 is provided with one or more longitudinally extending vent holes 89, to permit the pressure in the well casing below and on the outside of the thrust tube 88 to enter the interior of the thrust tube, and effect an equalizing of such fluid pressures, thereby preventing any pressures externally of the thrust tube from adversely affecting the operation of the apparatus. Relative rotation between the booster sleeve 82 and the thrust tube 88 is prevented by securing a key 90 to the lower portion of the booster sleeve below the lower gauge ring 86, which is slidable in a longitudinal keyway 91 in the thrust tube. Although the key and keyway connection 90, 91 prevents relative rotation between the booster sleeve 82 and the thrust tube 88, it permits relative longitudinal movement between these parts to take place.

The left-hand threaded connection 12, 13 between the lower end of the body 10 and the guide 14 is provided to permit the body to be unscrewed or unthreaded in an upward direction with respect to the guide, in the event that difficulty is encountered in freeing the tool from the well casing. Ordinarily, the lower portion of the tool, including the lower sets of slips 19 and lower expander 18, will be secured to the well casing, which will preclude movement and rotation of the booster sleeve 82 and the thrust tube 88 connected thereto, as well as the guide 14. However, in view of the left-hand threaded connection 12, 13, the tubular string C and body 10 of the tool can be rotated, to unscrew the body in an upward direction from the guide 14. As such unscrewing occurs, the flange 81 can engage the lower end of the lower slip ring 46 and will tend to force the lower slips 19 upwardly of the lower expander 18, allowing the slips to retract. The left-hand threaded connection 12, 13 functions as a jack screw, to forcibly effect a separation between the lower slips 19 and the lower expander 18, the force on the slips being transmitted from the body flange 81 to the lower slip ring 46, whereas the force on the lower expander 18 is exerted in a downward direction through the left-hand threads 12, 13, guide 14 and thrust tube 88 to the lower gauge ring 86, and from the lower gauge ring through the booster sleeve shoulder 87 and booster sleeve 82 to the lower expander 18.

In the event that the lower portion of the tool still cannot be retracted by use of the jack screw, then a continuation in the rotation of the body to the right will completely unthread the lower portion of the body 10 from the guide 14, whereupon a T-shaped ring or annular member 92 secured to the body 10 above the left-hand thread 12 will come into engagement with the lower end of the booster sleeve 82. This T-shaped ring has its transverse leg portion 93 secured within a peripheral groove in the tool body 10, the head 94 of the ring being movable into a circumferential recess 95 in the lower end of the booster sleeve. When disposed in this position, the body threads 12 are completely disconnected from the guide threads 13, permitting an upward strain to be taken on the body sufficient in magnitude to shear the leg 93 of the ring from its head 94, which will free the body of the tool from the booster sleeve 82 and allow the tool body 10 with all of the slip and clutch mechanism above the lower expander 18 to be removed from the well casing.

Figures 1, 2:
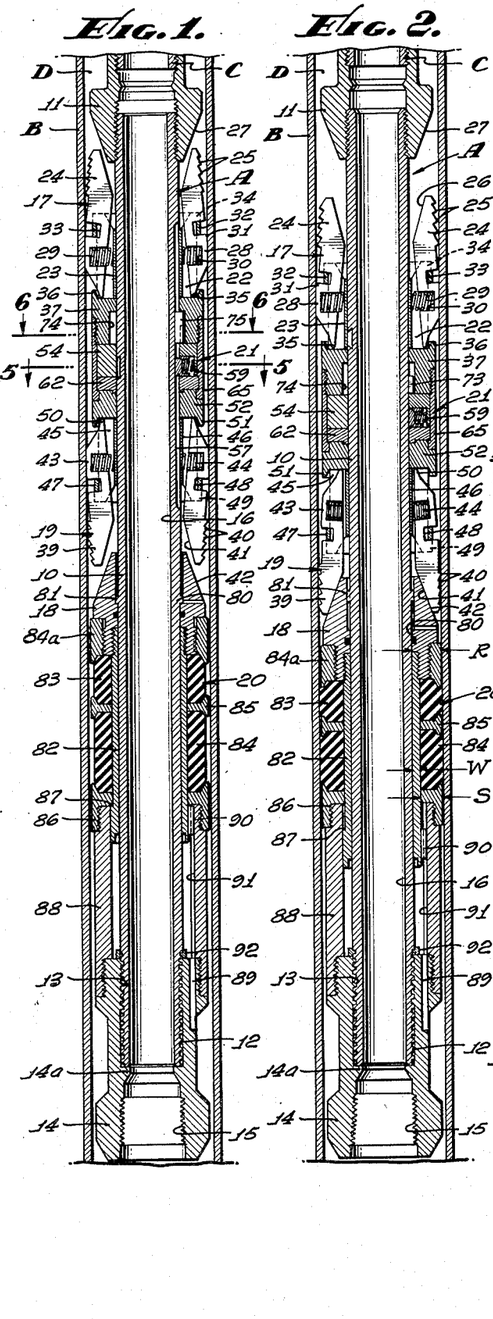
Figure 1 is a longitudinal section through a retrievable well packer, with the parts in position for moving the tool through a well casing.
Fig. 2 is a view similar to Fig. 1, disclosing the tool anchored in packed-off condition against upward movement in the well bore.
Figure 3:
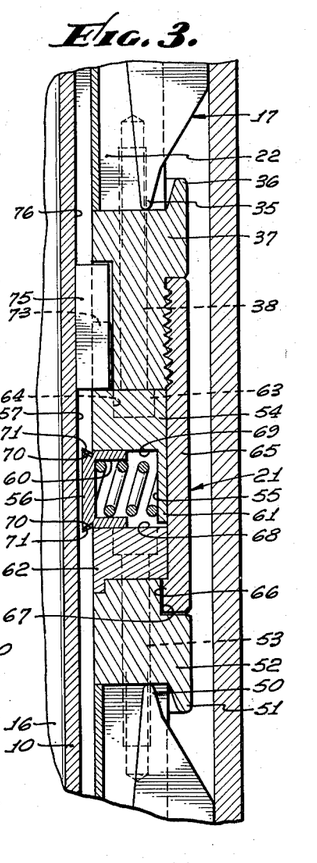
Fig. 3 is an enlarged fragmentary longitudinal section through the clutching portions of the apparatus disclosed in Figs. 1 and 2.
Figures 4, 5, 6, 7, 8:
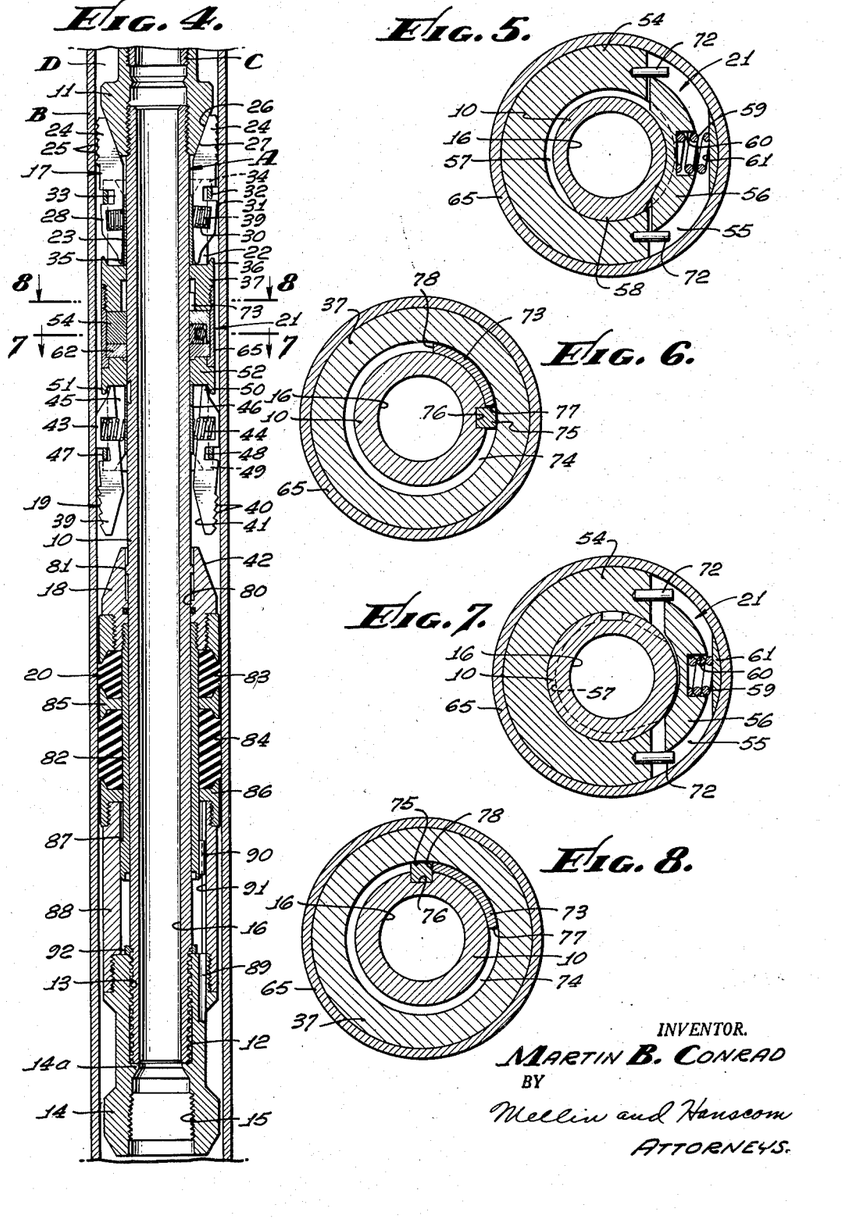
Fig. 4 is a view similar to Fig. 1, disclosing the tool anchored in packed-off condition against downward movement in the well casing.
Fig. 5 is an enlarged cross-section taken along the line 5—5 on Fig. 1.
Fig. 6 is an enlarged cross-section taken along the line 6—6 on Fig. 1.
Fig. 7 is an enlarged cross-section taken along the line 7—7 on Fig. 4, disclosing the clutching device in released position.
Fig. 8 is an enlarged cross-section taken along the line 8—8 on Fig. 4, disclosing the locating portion of the clutching device to positively position it in the released position shown in Fig. 7.

In the operation of the apparatus disclosed in Figs. 1 to 8, inclusive, the body 10 of the tool is turned until the key 75 engages the end 77 of the stop segment 73, which will place the body in the position to permit the lock segment 56 to enter the circumferential clutching groove 57 in the body. The body 10 is then moved longitudinally within the slip and packing structure in the proper direction until the lock segment snaps into the groove. When this occurs, the slips 17, 19 are locked in a neutral position between the upper and lower expanders 11, 18, which will preclude relative longitudinal movement between the expanders and the slips, and thereby prevent expansion of the upper and lower slips into anchoring engagement with the wall of the wall casing. In addition, the retention of the packing structure 20 in its retracted position, such as disclosed in Fig. 1, is assured. The lower expander 18 is prevented from moving upwardly along the body 10 to expand the lower slips 19 into engagement with the casing by engagement of the expander shoulder 80 with the body flange 81. The left-hand body threads 12 are threaded completely into the guide 14 until the lower end of the body engages a shoulder 14a in the guide, which will couple the guide 14, thrust tube 88 and lower gauge ring 86 for movement with the body. Since the lower gauge ring 86 engages the shoulder 87 on the booster sleeve 82, and since the latter is threadedly connected to the lower expander 18, the lower expander will move downwardly with the body.

The apparatus A is attached to the tubular string C and is inserted in the well casing B. The drag block portions 28, 43 of the upper and lower sets of slips 17, 19 offer resistance to downward movement of the slip structures in the well casing. However, in view of the fact that the slip structures are coupled to the body 10 of the tool, by virtue of the lock segment 56 being disposed in the body groove 57, downward movement of the tubular string and body through the well casing forces the slip structures downwardly in the well casing, the drag block portions 28, 43 frictionally sliding along the wall of the well casing. However, during such downward movement, the clutching device 21 prevents the upper expander 11 from moving downwardly within the upper set of slips 17 to expand the latter outwardly.

When the location in the well bore is reached at which it is desired to anchor the tool in packed-off condition against upward movement in the well casing, it is only necessary to rotate the tubing string C and the body 10 to the right. Since the friction drag block portions 28, 43 are resisting turning of the slip structures, the body 10 and the key 75 are turned, to rotate the bridge segment 58 with the body in a clockwise direction and place it behind the lock segment 56, urging the latter out of the groove 57. The fact that the lock segment is completely out of the groove is positively determined by engagement of the key 75 with the other end 78 of the arcuate stop segment 73. The tubing string C and body 10 are now elevated, which will permit the body to move upwardly through the slip structures, in view of the uncoupling of the latter with respect to the body. The periphery of the body 10 merely slides along the lock segment 56. As upward movement of the body takes place, the guide 14, thrust tube 88, packing structure 20 and lower expander 18 are moved upwardly with it, until the lower expander moves into the lower slips 19, shifting their gripping portions 39 outwardly into anchoring engagement with the wall of the well casing. Upon the occurrence of such anchoring engagement, the lower expander 18 is prevented from moving upwardly to any further extent. Accordingly, a continuation of the upward movement of the tubing string C and the body 10 of the tool will then move the lower gauge ring 86 toward the upper gauge ring 84 and expander 18, foreshortening the rubber packing rings or sleeves 83, 84 and expanding them outwardly into sealing engagement with the wall of the well casing.

The well packer A is now anchored in packed-off condition within the well casing against upward movement therewithin. The packing rings 83, 84 firmly seal against the wall of the well casing, as well as against the periphery of the booster sleeve 82, whereas leakage of fluid between the booster sleeve 82 and expander 18, on the one hand, and the body 10, on the other hand, may be precluded by the provision of a rubber or rubber-like seal ring 96 in the lower expander 18 slidably and sealingly engaging the periphery of the body.

Cement slurry, acid, formation fracturing material, or the like, may now be pumped down through the tubular string C and through the bore 16 in the body 10, which is of a large internal diameter, for discharge into the formation at some point below the set position of the well tool A. The fluid under pressure is prevented from forcing the tool up the hole because of the anchoring of the lower slips 19 against the well casing B. It is also prevented from leaking by the tool, by virtue of the expanded packing structure 20.

When it is desired to release the tool A, it is merely necessary to move the tubular string C and body 10 in a downward direction, which will remove the compressive force on the packing structure 20, allowing it to retract, and which will also effect a movement of the lower expander 18 downwardly out of wedging engagement with the lower set of slips 19. The relative downward movement of the body 10 through the slip structure is assured because of the frictional resistance to longitudinal movement offered by the drag block portions 28, 43 of the slips 17, 19. If it is desired to place the slips 17, 19 in a neutral position, in order to move the tool longitudinally to a new location in the well casing, or to remove the tool from the well casing, the tubing string C is merely turned to the left until the keyway 75 again engages the end 77 of the arcuate stop segment 73, which will insure the movement of the lock segment 56 into the groove 57 when the body is moved downwardly to align the groove with the lock segment. When the lock or clutching segment 56 is moved into the groove 57, assurance is had that the slips 17, 19 are locked against being expanded outwardly upon movement of the tool A in both longitudinal directions in the well casing B.

Assuming that the tool has been anchored in packed-off condition against upward movement in the well casing, as disclosed in Fig. 2, and a pressure differential is then imposed on fluid in the annulus D above the tool between the tubular string C and the well casing B, as, for example, by swabbing the tubing string, the tool will resist downward movement within the well casing. As the pressure is built up on the fluid in the annulus, such pressure will act in a downward direction over the entire annular cross-sectional area R of the packing structure 20 extending from the periphery of the body 10 to the wall of the well casing B, to urge the packing structure 20, thrust tube 82, guide 14 and body 10 in a downward direction, the body 10 and tubing string C being placed in tension and actually being stretched in a downward direction.

Such downward movement will carry the lower expander 18 downwardly with it out of engagement with and away from the lower slips 19, permitting the springs 44 to again rock the slips 19 and place their drag portions 43 in full frictional engagement with the wall of the well casing, tilting the gripping portions 39 inwardly out of engagement with the wall of the well casing. Downward stretching of the tubular string C and of the body 10 of the tool can occur until the upper expander 11 enters the upper set of slips 17, locking their gripping portions 24 outwardly to engage and wedge their wickers 25 into anchoring engagement with the wall of the well casing. Further downward movement of the body 10 of the tool cannot occur. The tool is now in the position disclosed in Fig. 4, in which it is anchored against downward movement in the well casing and its packing structure 20 is also packed-off against the well casing B, to prevent fluid pressure above the tool from being imposed on the fluid in the well casing below the packing structure 20.

The imposition of the fluid pressure differential in the tubing-casing annulus D above the packing structure 20 cannot effect release of the packing structure. The lower gauge ring 86 is resisting downward movement of the packing structure by virtue of the fact that the tubular string C and the body 10 are connected thereto through the guide 14 and thrust tube 88. This lower gauge ring 86 is exerting an upward force on the packing structure 20 over the annular cross-sectional area S of the latter extending between the periphery of the booster sleeve 82 and the wall of the well casing B. On the other hand, the pressure differential above the packing structure 20 is tending to move it downwardly and is acting over the entire annular area R of the packing structure, running from the periphery of the body 10 of the tool to the wall of the well casing. This annular area R is substantially greater than the area S over which the gauge ring is acting on the packing structure, by an amount at least equal to the cross-sectional area W of the booster sleeve 82 itself. Accordingly, there is a predominating force tending to shift the upper expander 18 and its gauge ring 84 toward the lower gauge ring 86, to maintain the packing structure 20 compressed against the casing, which will hold the packing structure sealed off against the well casing during the downward stretching of the tubular string C, the packing sleeves 83, 84 sliding, while in such packed-off condition, along the wall of the casing to the extent permitted by engagement of the upper expander 11 with the upper slips 17 and the anchoring of the latter against the wall of the well casing. The area W of the booster sleeve 82 insures that the packing structure 20 will not retract during the transferring movement of the body 10 of the tool to engage the upper expander 11 with the upper set of slips 17, which would permit the fluid pressure to bypass the packing structure and equalize around the tool. During the downward transferring of the tool to engage the upper expander with the upper slips, the lock segment 56 is ineffective to move into the circumferential body groove 17, since the arcuate bridge segment 58 of the body is then in alignment with the lock segment and will prevent such entry into the groove. Accordingly, the body 10 can slide through the clutching structure 21 in effecting the necessary transfer of the holding force.

As the pressure in the tubing-casing annulus D above the tool A is relieved, the tensile force on the tubular string C is also relieved, allowing the tubular string to contract toward its original position, the upper expander 11 moving out of the upper slips 17 and the lower expander 18 moving back into the lower slips 19. During all this time, the packing structure 20 remains in packed-off condition, merely sliding along the wall of the well casing, while remaining in firm sealing engagement therewith. When the parts have returned to the position disclosed in Fig. 2, pressure can again be applied, if desired, down through the tubing string C and the body 10 of the tool, and on the hole formation below the tool, the lower set of slips 19 preventing upward movement of the tool within the casing B under the action of such pressure.

When it is desired to retrieve the tool A from the well bore, its body 10 is rotated to the left to place the key 75 against the end 78 of the arcuate stop segment 73, which will then disalign the bridge segment 58 with respect to the lock segment 56. The tubular string C and body 10 can now be moved longitudinally in the proper direction until the lock groove 57 is in alignment with the clutching segment 56, permitting the spring 59 to move the latter inwardly into the groove 57 and couple the segment to the body 10 of the tool. During such downward movement, the packing structure 20 is shifted to its retracted position, the engagement of the lock segment 56 in the groove 57 insuring the retention of the packing structure 20 in its retracted position and the sets of slips 17, 19 in their retracted or neutral positions relative to the expanders 11, 18. When each expander moves out of engagement with the slips, the springs 29, 44 are effective to rock the drag portions 28, 43 into full engagement with the wall of the well casing B, and the gripping portions 24, 39 inwardly away from the wall of the well casing, such gripping portions then being in retracted position.

The tool may now be elevated in the well casing and removed from the well bore, if desired.

While the apparatus is in the well bore, the full bore 16 through it permits testing equipment, such as pressure recorders, to be lowered completely through the tool, as well as other equipment, such as jet perforators, that are capable of being passed down through the tubing string C. The full bore 16 through the tool also insures the absence of any restriction to flow of fluent materials through the tool that are to be pumped into the formation, such as sand suspended in a liquid medium, cement slurry, and the like.

In the event the tool becomes stuck in the hole, it can be freed by use of the jack screw feature between the body 10 and the guide 14 of the tool. The tubular string C and the body 10 of the tool are picked up to engage the lower expander 18 with the lower slips 19 and anchor the latter to the well casing. Such anchoring movement prevents the rotation of the booster sleeve 82, the thrust tube 88 and the guide 14. The tubular string and body can now be rotated to the right, the lower portion of the body then threading in an upward direction within the guide 14 until the body flange 81 engages the lower end of the slip sleeve 46. Rotation of the body can occur without rotating the lower slips 19, and the parts therebelow around the body, because of the swivel connection 65, 66, 67 between the upper slip structure 23, stop ring 37, limit ring 54, and clutching segment 56, on the one hand, and the lower slip structure 46, stop ring 52 and the spacer ring 62, on the other hand. Rotation of the body 10 will be transferred through the key 75 and arcuate stop segment 73 to the upper slip structure and the clutching elements themselves, these parts rotating around with the body relative to the spacer ring 62 and the lower slip structure. The body 10 feeds upwardly within the lower slip structure 46 and the packing structure 20 until the body flange 81 engages the lower slip sleeve 46, whereupon continued rotation causes the guide 14 to shift relatively downward of the body, carrying the thrust tube 88 down with it until the lower gauge ring 86 engages the shoulder 87 on the booster sleeve 82. Continued rotation then serves to jack the lower expander 18 in a downward direction and the slips 19 in an upward direction until the two are forcibly separated. Of course, the jack screw action is also effective in insuring retraction of the packing structure 20, inasmuch as the guide 14 can move downwardly to carry the thrust tube 88 and lower gauge ring 86 downwardly with it.

In the event the jack screw 12, 13 is effective to free the tool, the clutching device 21 can be reengaged to prevent expansion of the packer parts against the wall of the well casing, and the tool removed from the well bore.

Figure 9:
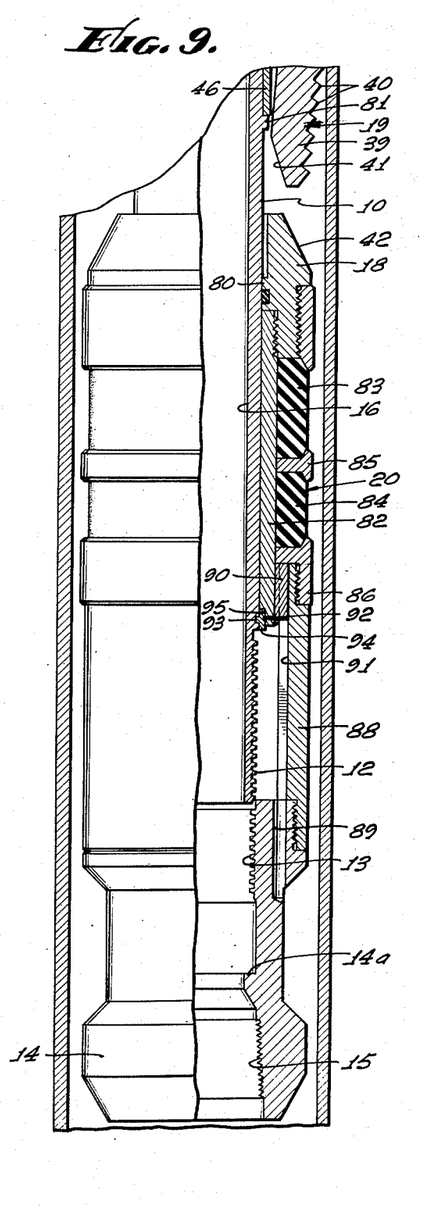
Fig. 9 is an enlarged longitudinal sectional and side elevational view of the lower portion of the well packer disclosed in Fig. 1, illustrating the operation and release of the safety joint.
Figure 10:
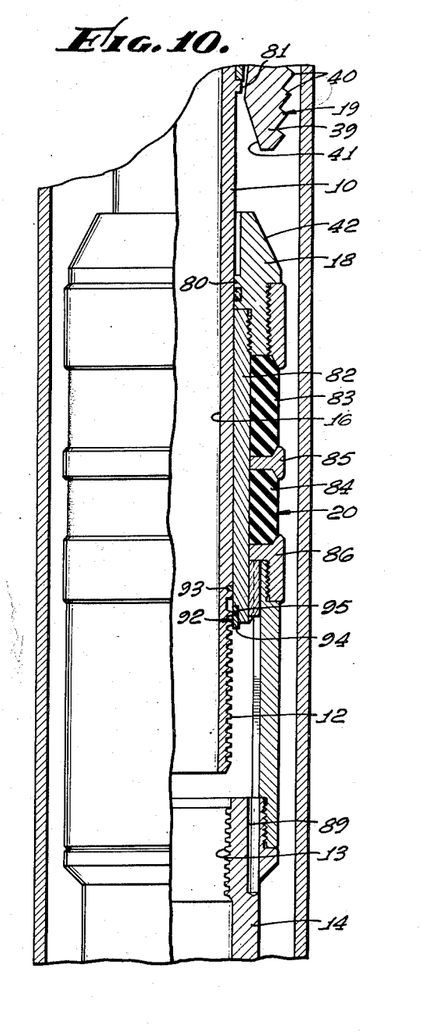
Fig. 10 is a view similar to Fig. 9, disclosing the safety joint in another operative condition.

Should the jack screw be ineffective in freeing the tool, then rotation of the body 10 is continued until the lower end of the body unthreads completely from the guide 14. This will occur before the shear ring 92 engages the lower end of the booster sleeve 82 (Fig. 9). Following complete unthreading of the body from the guide, an upward strain can then be taken on the tubular string C and body 10, to shear the shear ring 92 at the juncture between its leg 93 and head 94 (Fig. 10), the body 10 then being movable upwardly within the booster sleeve 82, carrying the entire slip structure above the lower expander 18 upwardly with it for removal from the well casing. The only parts that are left behind are the lower expander 18, packing structure 20, thrust tube 88 and guide 14, which can easily be removed through use of a suitable tool (not shown).

Figures 11, 12, 13:
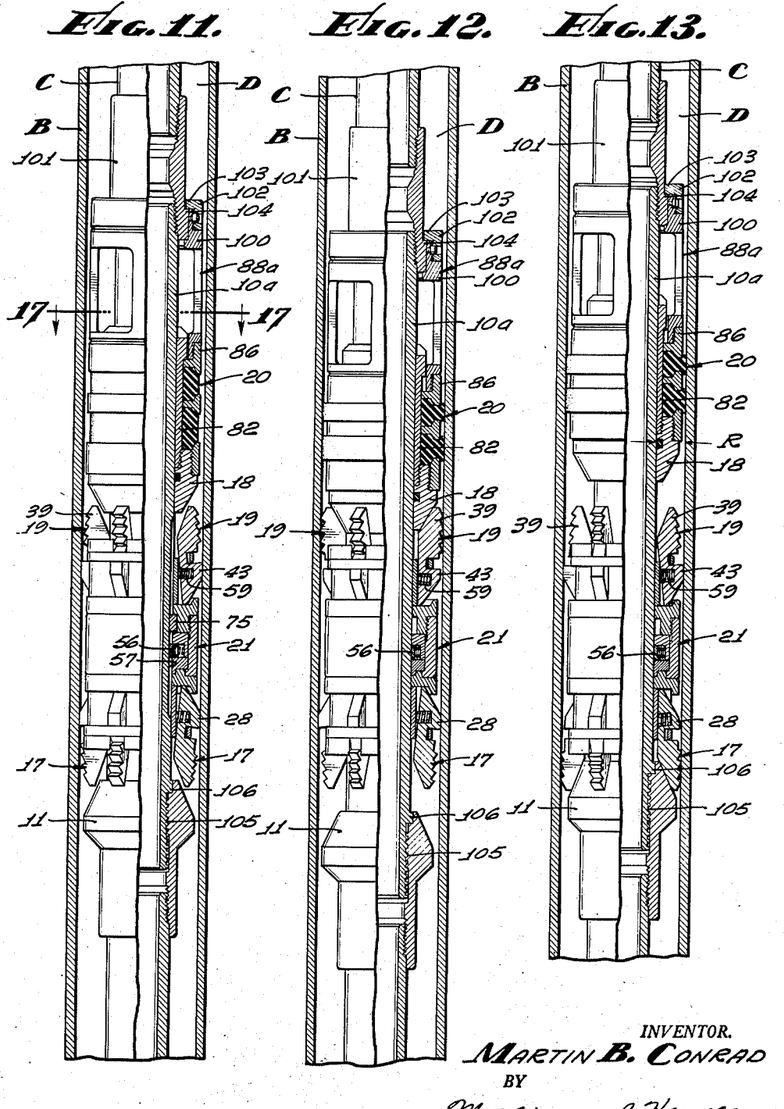
Fig. 11 is a combined side elevation and longitudinal sectional view through another form of the invention, with the parts in position for moving the tool through a well casing.
Fig. 12 is a view similar to Fig. 11, illustrating the tool anchored in packed-off condition in the well casing against downward movement.
Fig. 13 is a view similar to Fig. 11, illustrating the tool anchored in packed-off condition against upward movement in the well casing.

In the form of invention disclosed in Figs. 11 to 13, inclusive, the apparatus is essentially the same as the apparatus disclosed in Figs. 1 to 8, inclusive, except that the tool is inverted with respect to the latter equipment. Thus, the packing structure 20 is above the slip structure and is expanded outwardly against the casing when the clutching device 21 is released, and the tubular string C and the body 10a of the tool moved downwardly. Such downward movement will engage the upper expander 18 (which was the lower expander in the other form of invention) with the upper set of slips 19 and anchor them against the well casing. Following anchoring of the upper set of slips against the well casing, continued downward movement of the body 10a will cause the gauge ring 86 to move toward the expander 18 to foreshorten the packing structure 20 and expand it outwardly against the wall of the well casing. The connection between the body 10a of the tool and the gauge ring 86 in Figs. 11 to 13 inclusive, is different from the connection between the lower gauge ring and the guide 14 in the other form of the invention. Thus, the gauge ring 86 is threadedly secured to the lower end of a skeleton-like structure 88a, corresponding to the thrust tube 88 of the other form of the invention, the upper portion of this skeleton-like structure being swivelly secured to the body 10a, to move longitudinally therewith, while permitting the body to rotate with respect thereto. The upper portion 100 of the skeleton structure 88a engages the lower end of a body sub 101, there being a ring 102 threadedly secured onto the upper end of the skeleton member 88a. The ring has a flange 103 engaging an upwardly directed shoulder 104 on the body sub. The skeleton structure of the thrust member 88a between the upper gauge ring or abutment 86 and the body sub 101 is provided to insure that fluid pressure can act upon the entire upper end of the packing structure 20 between the booster sleeve 82 and the casing wall; whereas the provision of a solid thrust tube 88, as in the other form of the invention, might provide a different pressure outside of the tube than exists interiorly of the tube, particularly during movement of the apparatus through the fluid in the well casing.

The lower end of the body 10a of the tool is threadedly connected to the lower expander 11 through a left-hand threaded connection 105, which provides a safety joint between these parts. The body of the tool also has a flange 106 adapted to engage the lower end of the lower slip ring 23, but initially engaging the upper end of the lower expander 11.

The device illustrated in Figs. 11 to 13, does not include the shearing feature of the other form of the invention, but in all other respects, the relationship of parts is essentially the same, and need not be gone into in detail.

In the operation of the apparatus, the clutching segment 56 is disposed in the body groove 57, which will insure the retention of the slips 19, 17 in a neutral position with respect to the upper and lower expanders 18, 11, as well as the packing structure 20 in its retracted condition (Fig. 11). The apparatus is lowered through the fluid in the well casing to the desired point at which it is to be anchored, such anchoring usually being desired in a downward direction. When this location is reached, the tubular string C and the body 10a of the tool are rotated to the right, to cause the bridge segment 58 to shift the lock segment 56 out of the lock groove 57. The body 10a can now be lowered within the slip structure, since the longitudinal movement of the latter in the well casing is resisted by the drag block portions 28, 43 of the slips, to shift the upper expander 18 down within the upper set of slips 19 and anchor the latter against the well casing. When such anchoring occurs, the upper expander 18 cannot move any further, which then causes the body 10a to act through the upper skeleton thrust structure 88a and shift the upper gauge ring 86 toward the expander 18, foreshortening the packing structure 20 and expanding it outwardly into sealing engagement with the wall of the well casing (Fig. 12). The apparatus is now anchored in packed-off condition in the well casing against downward movement therewithin. If a pressure differential is now imposed in the annulus D between the tubing C and the casing B, such pressure differential will tend to hold the upper expander 18 wedged within the slips 19 and the packing structure 20 sealed off against the well casing. Such pressure differential might be imposed on the apparatus in the event it is used to test the formation below the apparatus, or in the event the tubular string C is swabbed, so that the pressure incident to the hydrostatic head of fluid in the tubing-casing annulus D is much greater than the hydrostatic head of pressure inside the tubular string C and body 10a of the tool, and acting in an upward direction over the packing structure 20.

With downweight imposed on the tubular string C and the tool anchored in packed-off condition against downward movement in the well casing, the pressure in the annulus D between the tubular string and the casing can be relieved and pressure then applied to the fluid in the tubular string C and the body 10a of the tool, which will act in an upward direction over the area of the body and over the area of the packing structure 20, tending to elevate such parts in the well bore. As a matter of fact, with the pressure applied to the packing structure 20 from below, the tubular string C and the body 10a of the tool can be raised, the pressure acting over the greater lower area R across the packing structure, holding it packed-off despite the upward movement of the upper expander 18 out of the upper sets of slips 19, which will now have its gripping portions 39 shifted to a retracted position. The body 10a of the tool will move upwardly, the packed-off packing structure 20 moving upwardly with the body under the influence of the pressure from below, and sliding along the wall of the casing B until the lower expander 11 engages and wedges within the lower sets of slips 17, to shift them outwardly into firm anchoring engagement with the wall of the well casing. Fluid under pressure to a very high degree can now be pumped down through the tubular string C and through the body 10a of the tool, which will be anchored in packed-off condition against the well casing, the parts occupying the position disclosed in Fig. 13.

In the event it is desired to release the tool, the pressure is bled off and the tool is rotated to the left to place its locating key 75 against the end 77 of the arcuate stop segment 73, which will again insure the movement of the lock ring 56 into the groove 57 when the latter parts are in transverse alignment with each other.

The apparatus can now be either raised or lowered to a different location in the well casing, or may be removed entirely from the well casing, the clutching device 21 preventing outward expansion of the slips 19, 17 and packing structure 20 into gripping and sealing engagement with the wall of the well casing.

In the event the tool gets stuck in the hole, because of the inability to release the lower set of slips 17 from their anchoring position against the well casing, they can be forcibly released through use of the jack screw arrangement 105 between the body 10a of the tool and the lower expander 11. When the parts are in the position referred to above, which is shown in Fig. 13, the anchored slips 17 prevent rotation of the lower expander 11. Accordingly, the tubular string C and the body 10a of the tool can be rotated to the right, which will effect an upward feeding of the body within the lower expander 11 until the body flange 106 engages the lower slip ring 23. Thereafter, continued rotation will forcibly jack the slips 17 in an upward direction and the expander 11 in a downward direction, to free the slips 17 from the casing and permit the parts to be moved to a retracted position.

The jack screw 106 is also effective in the event the clutch becomes inoperative to recouple the slip structures to the body, as, for example, through the breaking of the lock segment spring 59, which is then unavailable for shifting the segment 56 into the body groove 57. Should this occur, upward movement of the body will wedge the lower expander 11 into the lower slips 17 to anchor the latter against the casing, whereupon the tubular string C and body 10a can be rotated to the right, causing the body shoulder 106 to bear against the lower slip ring 23 and urge the slips 17 in an upward direction, with the left-hand threads 105 urging the lower expander 11 in a downward direction, separating the lower expander and slips 17 and allowing the latter to retract. Following release of the slips 17, the flange 106 and left-hand threaded connection 105 will then prevent the lower expander 11 from moving up within the lower slips 17 to anchor the latter against the casing during upward movement of the apparatus in the well casing.

The swivel connection 100—104 between the packing structure 20 and the body 10a of the tool is provided to enable the lower left-hand threaded safety joint 105 to be operated in the event the pressure below the tool holds the packing structure 20 firmly in a packed-off condition, or in the position disclosed in Fig. 13. With the upper swivel connection 100—104, it is possible to rotate the body 10a of the tool with respect to the packing structure 20 to unthread the safety joint 105 and effect a jack screw action upon the lower slips 17 and lower expander 11, to separate the latter two parts. When such separation occurs, and the lower slips 17 are moved to a partial or retracted position in the well casing, then an adequate strain can be taken on the tubular string C and the body 10a of the tool, to elevate the tool in the well casing, since the lower slips are ineffective to prevent such elevation.

Figure 14:
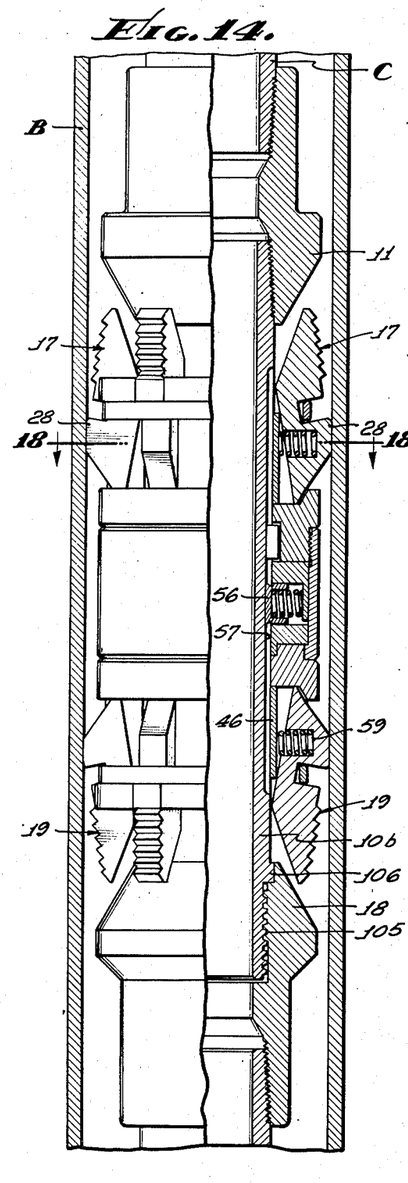
Fig. 14 is a side elevational and longitudinal sectional view through still another embodiment of the invention, with the parts arranged for moving the tool in a well casing.
Figure 15:
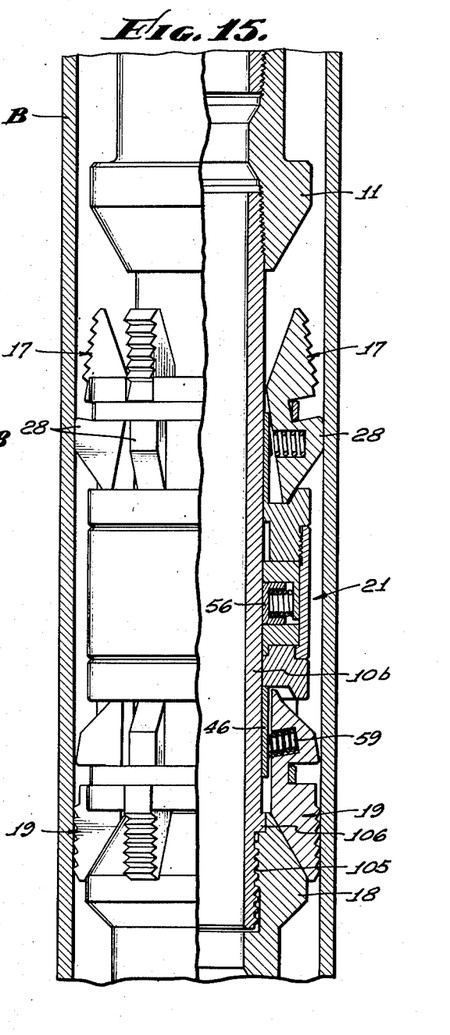
Fig. 15 is a view similar to Fig. 14, disclosing the tool anchored against upward movement in the well casing.
Figures 16, 17, 18:
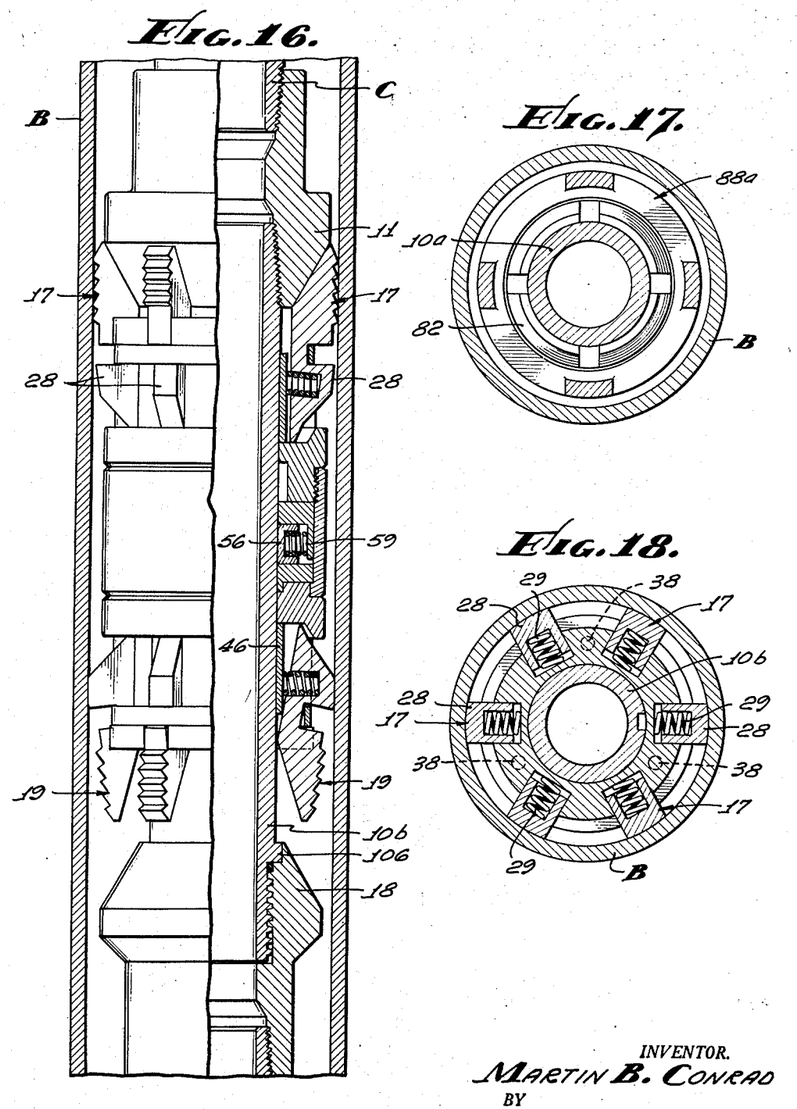
Fig. 16 is a view similar to Fig. 14, illustrating the tool anchored against downward movement in the well casing.
Fig. 17 is an enlarged cross-section taken along the line 17—17 on Fig. 11.
Fig. 18 is a cross-section taken along the line 18—18 on Fig. 14.

The form of invention disclosed in Figs. 14, 15 and 16 is a tubing anchor and catcher for permitting a tubing string C to be held in tension in a well casing B. The apparatus is essentially the same as disclosed in the other forms of the invention, with the exception that the packing structure 20 is omitted. Both expanders 11, 18 are normally secured directly to the body 10b of the tool. Thus, the upper expander 11 is threadedly attached to the upper end of the tool body 10b, whereas the lower expander 18 is threadedly attached to the lower end of the tool body by means of the left-hand threaded interconnection 105. The clutching arrangement is the same as disclosed in Figs. 1 to 8, inclusive, and operates in the same manner. The same is true of the slip arrangement.

The apparatus shown in Figs. 14, 15 and 16 is run in the well bore with the clutching segment 56 disposed in the body groove 57, which prevents setting of the gripping portions 24 of the slips 17 against the well casing, such portions being retracted from the well casing, with only the drag portions 28 of the slip members in frictional engagement with the well casing (Fig. 13). When the anchor and packer has been lowered in the well casing to the desired anchoring point, the tubular string C and the body 10b of the tool are rotated, to release the clutching device 21, whereupon an upward strain can be taken on the tubing string, which will shift the lower expander 18 upwardly within the lower slips 19 and anchor the latter firmly against the well casing. Thus, the tubing string C can be held in tension by virtue of the coaction between the lower expander 18 and lower slips 19.

The tubing anchor is useful in maintaining a tubing string in tension during the operation of a deep well pump, to render the pumping action more effective and efficient, all in a known manner.

In the event the tubing C should part in the well casing, the apparatus is effective to prevent its dropping down the well casing, except to a very slight extent necessary to cause the upper expander 11 to shift down within the upper set of slips 17, expanding the latter into anchoring engagement with the well casing. Thus, in the event of a break in the tubing C, the upper expander 11 and upper set of slips 17 act as a tubing catcher to prevent the tubing C from dropping down the hole (Fig. 16).

As in the other forms of the invention, when it is desired to retrieve the tool, it is merely necessary to rotate the body 10b appropriately, to place the circumferential body groove 57 in appropriate position with respect to the clutching segment 56, whereupon the body is moved longitudinally to place the groove 57 and segment 56 in transverse alignment, the segment spring 59 then shifting the segment into the groove to couple the slip structure to the body and prevent expansion of either the upper or lower sets of slips 17 or 19 into anchoring engagement with the well casing. The apparatus can now be removed from the well casing, or shifted either upwardly or downwardly therewithin to a new anchoring location.

In the event difficulty is encountered in freeing the lower sets of slips 19 from the well casing, the tubing string C and body 10b can be rotated, to unthread the lower end of the body in an upward direction with respect to the lower expander 18. The body flange 106 will engage the lower slip ring 46, whereupon continued rotation of the body will effect an upward jacking of the slips 19 and a downward forcing upon the lower expander 18 in opposite directions, to forcibly separate these parts and secure the release and retraction of the lower slips 19 from the well casing, whereupon the tool can be elevated in the well casing and removed therefrom.

From the foregoing description, it is apparent that apparatus has been provided which is capable of anchoring the tool to the well casing against movement in both longitudinal directions and of being retrieved from the well bore whenever desired or to be shifted to a different setting location in the well bore whenever desired. In the well packer versions of the invention, the tool can withstand high pressures in leakproof fashion that exists below the packing structure as well as above the packing structure, such pressures being reversed, if desired, at any time, the tool remaining in packed-off condition despite such reversal. The ability of the tool to remain in packed-off condition to hold the tool in both directions and to withstand pressures either from above or below the tool makes it very versatile, since it can be used during a single trip in the well bore for applying pressure to the formation, for testing the formation or well casing by taking the fluid load in the annulus above the tool off the formation, and for again applying pressure to the formation. The tool is relatively short and compact, being easily shifted between coupled and uncoupled positions merely by rotating the tubular string and the body of the tool in the proper direction. When in the uncoupled position, the tool will remain in that condition without the necessity for maintaining any torques on the tubular string and body. Once placed in the uncoupled position, the tubular string and body can then be shifted upwardly or downwardly, as desired, to either anchor the tool against upward movement in the well casing or against downward movement therein. It is only when the condition of the clutching device is to be changed that rotation of the tubular string and the body of the tool becomes necessary. The packing structure automatically transfers when the direction of pressure imposed thereon is reversed, so as to remain in packed-off condition despite such reversal in its direction of pressure. It is also again to be noted that the passage through the tool is very large, enabling the ready pumping therethrough of fluent substances, even those containing a large quantity of solids, as well as the movement therethrough of instruments and equipment.

The inventor claims:

1. In a well tool: a body adapted to be moved longitudinally in a well conduit; upper and lower expander means on said body; conduit engageable slip means slidable longitudinally with respect to said body and upper and lower expander means and coacting with said upper and lower expander means to anchor said body to the conduit against substantial longitudinal movement in both directions; and releasable clutching means acting between said body and slip means, which clutching means is engaged or released to selectively prevent or permit longitudinal movement, respectively, in both directions of said slip means with respect to said body.

2. In a well tool: an imperforate tubular body adapted to be moved longitudinally in a well conduit; upper and lower expander means on said body; conduit engageable slip means slidable longitudinally with respect to said body and upper and lower expander means and coacting with said upper and lower expander means to anchor said body to the conduit against substantial longitudinal movement in both directions; and releasable clutching means acting between an external portion of said body and said slip means, which clutching means is engaged or released to selectively prevent or permit longitudinal movement, respectively, in both directions of said slip means with respect to said body.

3. In a well tool: a body adapted to be moved longitudinally in a well conduit; upper and lower expander means on said body; conduit engageable slip means slidable longitudinally with respect to said body and upper and lower expander means and coacting with said upper and lower expander means, said upper expander means and slip means coacting with each other to anchor said body to the conduit against downward movement, said lower expander and slip means coacting with each other to anchor said body to the conduit against upward movement; means frictionally engageable with the conduit and coupled to said slip means to resist movement of said slip means in said conduit to enable said body and upper and lower expander means to be moved longitudinally with respect to said slip means; and releasable clutching means acting between said body and slip means and operable by manipulation of said body to be placed in engaged or released condition to selectively prevent or permit longitudinal movement, respectively, in both directions of said slip means with respect to said body.

4. In a well tool: an imperforate tubular body adapted to be moved longitudinally in a well conduit; upper and lower expander means on said body; conduit engageable slip means slidable longitudinally with respect to said body and upper and lower expander means and coacting with said upper and lower expander means, said upper expander means and slip means coacting with each other to anchor said body to the conduit against downward movement, said lower expander means and slip means coacting with each other to anchor said body to the conduit against upward movement; means frictionally engageable with the conduit and coupled to said slip means to resist movement of said slip means in said conduit to enable said body and upper and lower expander means to be moved longitudinally with respect to each other; and releasable clutching means acting between an external portion of said body and said slip means and operable by manipulation of said body to be placed in engaged or released condition to selectively prevent or permit longitudinal movement, respectively, in both directions of said slip means with respect to said body.

5. In a well tool: a body adapted to be moved longitudinally in a well conduit; upper and lower expander means on said body; conduit engageable slip means slidable longitudinally with respect to said body and upper and lower expander means and coacting with said upper and lower expander means to anchor said body to the conduit against substantial longitudinal movement in both directions; one of said expander means being slidable on said body; normally retracted packing means on said body engageable at one end of said slidable expander means; means engageable with the other end of said packing means and movable toward said slidable expander to expand said packing means into engagement with the conduit; and releasable clutching means acting between said body and slip means, which clutching means is engaged or released to selectively prevent or permit longitudinal movement, respectively, in both directions of said slip means with respect to said body.

6. In a well tool: a body adapted to be moved longitudinally in a well conduit; upper and lower expander means on said body; conduit engageable slip means slidable longitudinally with respect to said body and upper and lower expander means and coacting with said upper and lower expander means, said upper expander means and slip means coacting with each other to anchor said body to the conduit against downward movement, said lower expander and slip means coacting with each other to anchor said body to the conduit against upward movement; means frictionally engageable with the conduit and coupled to said slip means to resist movement of said slip means in said conduit to enable said body and upper and lower expander means to be moved longitudinally with respect to said slip means; one of said expander means being slidable on said body; normally retracted packing means on said body engageable at one end of said slidable expander means; means engageable with the other end of said packing means and movable toward said slidable expander to expand said packing means into engagement with the conduit; and releasable clutching means acting between said body and slip means and operable by manipulation of said body to be placed in engaged or released condition to selectively prevent or permit longitudinal movement, respectively, in both directions of said slip means with respect to said body.

7. In a well tool: a body adapted to be moved longitudinally in a well conduit; an upper expander secured to said body; a lower expander slidable on said body; conduit engageable slip means around said body between said expanders slidable longitudinally with respect to said body, said upper expander and slip means coacting with each other to anchor said body against downward movement in the conduit, said lower expander and slip means coacting with each other to anchor said body against upward movement in the conduit; normally retracted packing means on said body below and engageable with said lower expander; means engageable with said packing means and movable by said body toward said lower expander to expand said packing means into engagement with the conduit; and releasable clutching means acting between said body and slip means, which clutching means is engaged or released to selectively prevent or permit longitudinal movement, respectively, in both directions of said slip means with respect to said body.

8. In a well tool: a body adapted to be moved longitudinally in a well conduit; an upper expander slidable on said body; a lower expander secured to said body; conduit engageable slip means around said body between said expanders slidable longitudinally with respect to said body, said upper expander and slip means coacting with each other to anchor said body against downward movement in the conduit, said lower expander and slip means coacting with each other to anchor said body against upward movement in the conduit; normally retracted packing means on said body above and engageable with said upper expander; means engageable with said packing means and movable by said body toward said upper expander to expand said packing means into engagement with the conduit; and releasable clutching means coacting between said body and slip means, which clutching means is engaged or released to selectively prevent or permit longitudinal movement, respectively, in both directions of said slip means with respect to said body.

9. In a well tool: a body adapted to be moved longitudinally in a well conduit; upper and lower expander means on said body; conduit engageable slip means slidable longitudinally with respect to said body and upper and lower expander means and coacting with said upper and lower expander means to anchor said body to the conduit against substantial longitudinal movement in both directions; one of said expander means being slidable on said body; a sleeve secured to said slidable expander means and slidable on the exterior of said body in close contacting leak-proof relation to said body exterior; normally retracted packing means on said sleeve having one end engaging said slidable expander means; an abutment slidable on said sleeve and engageable with the other end of said packing means and movable relatively toward said slidable expander means to expand said packing means into engagement with the conduit; and releasable clutching means acting between said body and slip means, which clutching means is engaged or released to selectively prevent or permit longitudinal movement, respectively, in both directions of said slip means with respect to said body.

10. In a well tool: a body adapted to be moved longitudinally in a well conduit; an upper expander secured to said body; a lower expander slidable on said body; conduit engageable slip means around said body between said expanders slidable longitudinally with respect to said body, said upper expander and slip means coacting with each other to anchor said body against downward movement in the conduit, said lower expander and slip means coacting with each other to anchor said body against upward movement in the conduit; a sleeve secured to said slidable expander means and slidable on the exterior of said body below said slidable expander means in close contacting leakproof relation to said body exterior; normally retracted packing means on said sleeve having its upper end engaging said slidable expander means; an abutment slidable on said sleeve and engageable with the lower end of said packing means and movable longitudinally toward said slidable expander means to expand said packing means into engagement with the conduit; and releasable clutching means acting between said body and slip means, which clutching means is engaged or released to selectively prevent or permit longitudinal movement, respectively, in both directions of said slip means with respect to said body.

11. In a well tool: a body adapted to be moved longitudinally in a well conduit; an upper expander slidable on said body; a lower expander secured to said body; conduit engageable slip means around said body between said expanders slidable longitudinally with respect to said body, said upper expander and slip means coacting with each other to anchor said body against downward movement in the conduit, said lower expander and slip means coacting with each other to anchor said body against upward movement in the conduit; a sleeve secured to said slidable expander means and extending thereabove in close contacting slidable leakproof relation to said body exterior; normally retracted packing means on said sleeve having its lower end engaging said slidable expander means; an abutment slidable on said sleeve and engageable with the upper end of said packing means and movable relatively toward said slidable expander means to expand said packing means into engagement with the conduit; and releasable clutching means acting between said body and slip means, which clutching means is engaged or released to selectively prevent or permit longitudinal movement, respectively, in both directions of said slip means with respect to said body.

12. In a well tool: a body adapted to be moved longitudinally in a well conduit; upper and lower expanders secured to said body; conduit engageable slip means slidable longitudinally with respect to said body and coacting with said upper and lower expanders, said upper expander and slip means coacting with each other to anchor said body to the conduit against downward movement, said lower expander and slip means coacting with each other to anchor said body to the conduit against upward movement; means frictionally engageable with the conduit and coupled to said slip means to resist movement of said slip means in said conduit; and releasable clutching means acting between said body and slip means and operable by manipulation of said body to be placed in engaged or released condition to selectively prevent or permit longitudinal movement, respectively, in both directions of said slip means with respect to said body and expanders.

13. In a well tool: a body adapted to be moved longitudinally in a well conduit; normally retracted means carried by said body and expandible into engagement with the conduit; a member connected to said normally retracted means and having a thread; said body having a thread meshing with said member thread; means on said body engageable with said normally retracted means in response to rotation of said body with respect to said member and feeding of said body thread along said member thread for releasing said normally retracted means from the conduit; and an annular member shearably connected to said body and engageable with said normally retracted means, after unthreading of said body from said member thread, shearing of said annular member allowing upward movement of said body through at least part of said normally retracted means.

14. In a well tool: a body adapted to be moved longitudinally in a well conduit; an upper expander secured to said body; a lower expander slidable on said body; conduit engageable slip means around said body between said expander slidable longitudinally with respect to said body, said upper expander and slip means coacting with each other to anchor said body against downward movement in the conduit, said lower expander and slip means coacting with each other to anchor said body against upward movement in the conduit; normally retracted packing means on said body below and engageable with said lower expander; actuating means engageable with said packing means and movable by said body toward said lower expander to expand said packing means into engagement with the conduit; releasable clutching means acting between said body and slip means, which clutching means is engaged or released to selectively prevent or permit longitudinal movement, respectively, in both directions of said slip means with respect to said body; said actuating means having an internal left-hand thread; said body having an external left-hand thread threaded in said internal thread; means on said body engageable with said slip means in response to rotation of said body with respect to said member and feeding of said body thread along said internal thread for releasing said slip means from the conduit; and an annular member shearably connected to said body and engageable with said packing means after unthreading of said body from said internal thread, shearing of said annular member allowing upward movement of said body through said packing means.

15. In a well tool: a body adapted to be moved longitudinally in a well conduit; an expander slidable on said body; conduit engageable slip means around said body coacting with said expander to anchor said body against upward movement in the conduit; normally retracted packing means on said body below and engageable with said expander; actuating means engageable with said packing means and movable by said body toward said expander to expand said packing means into engagement with the conduit; said actuating means having an internal left-hand thread; said body having an external left-hand thread threaded in said internal thread; means on said body engageable with said slip means in response to rotation of said body with respect to said member and feeding of said body thread along said internal thread for releasing said slip means from the conduit; and an annular member shearably connected to said body and engageable with said packing means after unthreading of said body from said internal thread, shearing of said annular member allowing upward movement of said body through said packing means.

16. In a well tool: a body adapted to be moved longitudinally in a well conduit; an upper expander slidable on said body; a lower expander secured to said body; conduit engageable slip means around said body between said expanders slidable longitudinally with respect to said body, said upper expander and slip means coacting with each other to anchor said body against downward movement in the conduit, said lower expander and slip means coacting with each other to anchor said body against upward movement in the conduit; normally retracted packing means on said body above and engageable with said upper expander; actuating means engageable with said packing means and movable by said body toward said upper expander to expand said packing means into engagement with the conduit; releasable clutching means coacting between said body and slip means, which clutching means is engaged or released to selectively prevent or permit longitudinal movement, respectively, in both directions of said slip means with respect to said body; said lower expander having an internal left-hand thread; said body having an external left-hand thread threaded in said internal thread; means on said body engageable with said slip means in response to rotation of said body with respect to said lower expander and feeding of said body thread along said internal thread for releasing said slip means from the conduit; and a swivel connection between said actuating means and body.

17. In a well tool adapted for operation in a well bore: a body member connectible to a running-in string for moving the tool within the well bore; a clutching member slidable longitudinally on said body member; one of said members having a groove; a clutching element movable laterally on the other of said members into said groove to couple said members for longitudinal movement together; and cam means on said one member operable in response to relative rotation between said members to engage and shift said clutching element laterally from said groove to uncouple said members from each other.

18. In a well tool adapted for operation in a well bore: a body member connectible to a running-in string for moving the tool within the well bore; a clutching member slidable longitudinally on said body member; one of said members having a groove; a clutching element movable laterally on the other of said members; spring means engaging said element to shift said element into said groove to couple said members for longitudinal movement together; and cam means on said one member operable in response to relative rotation between said members to engage and shift said clutching element laterally from said groove to uncouple said members from each other.

19. In a well tool adapted for operation in a well bore: a body member connectible to a running-in string for moving the tool within the well bore; a clutching member slidable longitudinally on said body member; one of said members having an arcuate groove; a clutching element movable laterally on the other of said members into said groove to couple said members for longitudinal movement together; and cam means on said one member between the ends of said groove operable in response to relative rotation between said members to engage and shift said clutching element laterally from said groove to uncouple said members from each other.

20. In a well tool adapted for operation in a well bore: a body member connectible to a running-in string for moving the tool within the well bore; a clutching member slidable longitudinally on said body member; one of said members having an arcuate groove; a clutching element movable laterally on the other of said members; spring means engaging said element to shift said element into said groove to couple said members for longitudinal movement together; and cam means on said one member between the ends of said groove operable in response to relative rotation between said members to engage and shift said clutching element laterally from said groove to uncouple said members from each other.

21. In a well tool adapted for operation in a well bore: a body member connected to a running-in string for moving the tool within the well bore; a clutching member slidable longitudinally on said body member; said body member having a groove; a clutching element movable laterally on said clutching member into said groove to couple said members for longitudinal movement together; and cam means on said body member operable in response to rotation of said body member with respect to said clutch member to engage and shift said clutching element laterally from said groove to uncouple said members from each other.

22. In a well tool adapted for operation in a well bore: a body member connectible to a running-in string for moving the tool within the well bore; a clutching member slidable longitudinally on said body member; said body member having a groove; a clutching element movable laterally on said clutching member; spring means engaging said element to shift said element into said groove to couple said members for longitudinal movement together; and cam means on said body member operable in response to rotation of said body member with respect to said clutching member to engage and shift said clutching element laterally from said groove to uncouple said members from each other.

23. In a well tool adapted for operation in a well bore: a body member connectible to a running-in string for moving the tool within the well bore; a clutching member slidable longitudinally on said body member; said body member having an arcuate groove therein; a clutching element movable laterally on said clutching member into said groove to couple said members for longitudinal movement together; and cam means on said body member between the ends of said groove operable in response to rotation of said body member within said clutching member to engage and shift said clutching element laterally from said groove to uncouple said members from each other.

24. In a well tool adapted for operation in a well bore: a body member connectible to a running-in string for moving the tool within the well bore; a clutching member slidable longitudinally on said body member; said body member having an arcuate groove therein; a clutching element movable laterally on said clutching member; spring means engaging said element to shift said element into said groove to couple said members for longitudinal movement together; and cam means on said body member between the ends of said groove operable in response to rotation of said body member relative to said clutching member to engage and shift said clutching element laterally from said groove to uncouple said members from each other.

25. In a well tool adapted for operation in a well bore:

a body member connectible to a running-in string for moving the tool within the well bore; a clutching member slidable longitudinally on said body member; one of said members having a groove; a clutching element movable laterally on the other of said members into said groove to couple said members for longitudinal movement together; cam means on said one member operable in response to relative rotation between said members to engage and shift said clutching element laterally from said groove to uncouple said members from each other; and coengageable means on said members for selectively locating said clutching element in position for engagement by said cam means or in position for movement into said groove.

26. In a well tool adapted for operation in a well bore: a body member connectible to a running-in string for moving the tool within the well bore; a clutching member slidable longitudinally on said body member; one of said members having an arcuate groove; a clutching element movable laterally on the other of said members into said groove to couple said members for longitudinal movement together; cam means on said one member between the ends of said groove operable in response to relative rotation between said members to engage and shift said clutching element laterally from said groove to uncouple said members from each other; and means on said members engageable with each other in response to relative rotation between said members for selectively locating said clutching element in longitudinal alignment with said arcuate groove or with said cam means.

27. In a well tool adapted for operation in a well bore: a body member connectible to a running-in string for moving the tool within the well bore; a clutching member slidably longitudinally on said body member; said body member having an arcuate groove therein; a clutching element movable laterally on said clutching member into said groove to couple said members for longitudinal movement together; cam means on said body member between the ends of said groove operable in response to rotation of said body member within said clutching member to engage and shift said clutching element laterally from said groove to uncouple said members from each other; and means on said members engageable with each other in response to rotation of said body member within said clutching member for selectively locating said clutching element in longitudinal alignment with said arcuate groove or with said cam means.

28. In a well tool adapted for operation in a well bore: a body member connectible to a running-in string for moving the tool within the well bore; a clutching member slidable longitudinally on said body member; said body member having an arcuate groove therein; a clutching element movable laterally on said clutching member; spring means engaging said element to shift said element into said groove to couple said members for longitudinal movement together; cam means on said body member between the ends of said groove operable in response to rotation of said body member relative to said clutching member to engage and shift said clutching element laterally from said groove to uncouple said members from each other; and means on said members engageable with each other in response to rotation of said body member within said clutching member for selectively locating said clutching element in longitudinal alignment with said arcuate groove or with said cam means.

29. In a well tool: a body adapted to be moved longitudinally in a well conduit; upper and lower expander means on said body; conduit engageable slip means slidable longitudinally with respect to said body and upper and lower expander means and coacting with said upper and lower expander means to anchor said body to the conduit against substantial longitudinal movement in both directions; said body having an arcuate groove therein; a clutching element movable laterally on said slip means into said groove to couple said body and slip means for longitudinal movement together; and cam means on said body operable in response to rotation of said body to engage and shift said clutching element laterally from said groove to permit said body to move longitudinally of said slip means.

30. In a well tool: a body adapted to be moved longitudinally in a well conduit; upper and lower expander means on said body; conduit engageable slip means slidable longitudinally with respect to said body and upper and lower expander means and coacting with said upper and lower expander means to anchor said body to the conduit against substantial longitudinal movement in both directions; said body having an arcuate groove therein; a clutching element movable laterally on said slip means into said groove to couple said body and slip means for longitudinal movement together; cam means on said body operable in response to rotation of said body to engage and shift said clutching element laterally from said groove to permit said body to move longitudinally of said slip means; and means on said body and slip means engageable with each other in response to rotation of said body for selectively locating said groove in said cam means in longitudinal alignment with said clutching element.

31. In a well tool: a body adapted to be moved longitudinally in a well conduit; an upper expander secured to said body; a lower expander slidable on said body; conduit engageable slip means around said body between said expanders slidable longitudinally with respect to said body, said upper expander and slip means coacting with each other to anchor said body against downward movement in the conduit, said lower expander and slip means coacting with each other to anchor said body against upward movement in the conduit; normally retracted packing means on said body below and engageable with said lower expander; actuating means engageable with said packing means and movable by said body toward said lower expander to expand said packing means into engagement with the conduit; said body having an arcuate groove therein; a clutching element movable laterally on said slip means into said groove to couple said body and slip means for longitudinal movement together; cam means on said body operable in response to rotation of said body to engage and shift said clutching element laterally from said groove to permit said body to move longitudinally of said slip means; means on said body and slip means engageable with each other in response to rotation of said body for selectively locating said groove or said cam means in longitudinal alignment with said clutching element; said actuating means having an internal left-hand thread; said body having an external left-hand thread threaded in said internal thread; means on said body engageable with said slip means in response to rotation of said body with respect to said member and feeding of said body thread along said internal thread for releasing said slip means from the conduit; said slip means embodying a swivel to permit said clutching element and locating means to rotate with said body relative to at least part of said slip means.

References Cited in the file of this patent
UNITED STATES PATENTS

| 2,167,019 | Yost | July 25, 1939 |
| 2,578,900 | Ragan | Dec. 18, 1951 |
| 2,751,012 | Baker et al. | June 19, 1956 |